United States Patent [19]
Foster

[11] 3,944,017
[45] Mar. 16, 1976

[54] SUSPENSION FOR TRUCK CAB
[75] Inventor: Albert W. Foster, Royal Oak, Mich.
[73] Assignee: Ford Motor Company, Dearborn, Mich.
[22] Filed: Dec. 23, 1974
[21] Appl. No.: 535,926

[52] U.S. Cl.......... 180/89 A; 296/28 C; 280/DIG. 1
[51] Int. Cl.² .......................................... B62D 27/00
[58] Field of Search ................ 180/89 A; 296/28 C; 280/106.5; 296/35 A, 35 R

[56] References Cited
UNITED STATES PATENTS

| | | | |
|---|---|---|---|
| 3,420,568 | 1/1969 | Henriksson et al. | 280/106.5 R |
| 3,606,437 | 9/1971 | Pierce | 296/35 R |
| 3,661,236 | 5/1972 | Wossner | 188/322 |
| 3,667,565 | 6/1972 | Steiner et al. | 296/35 R |
| 3,733,087 | 5/1973 | Allison | 280/96.2 R |
| 3,841,694 | 10/1974 | Merkle | 296/35 R |

*Primary Examiner*—Kenneth H. Betts
*Attorney, Agent, or Firm*—Clifford L. Sadler; Keith L. Zerschling

[57] ABSTRACT

The present disclosure relates to suspension means for supporting the cab of a truck on a truck chassis frame. It is disclosed in the environment of a tilt cab type truck. The suspension includes a pair of front and a pair of rear suspension arms that interconnect the cab and the frame. Front air springs are interposed between the front arms and the frame. The rear arms are connected to the frame by releaseable latch mechanisms and rear air springs are interposed between the latch mechanisms and the cab. An anti-roll stabilizer bar extends transversely between the front arms and functions to prevent tilting of the cab about a longitudinal roll axis.

1 Claim, 6 Drawing Figures

SUSPENSION FOR TRUCK CAB

BACKGROUND OF THE DISCLOSURE

This disclosure relates to improved suspension means for a truck cab that isolates road irregularities from the cab and, thereby, enhances driver comfort and reduces fatique. In an automobile, the suspension supporting the vehicle body upon the wheels is designed to have a low spring rate for the principal purpose of providing maximum comfort to the driver and passengers of the vehicle. In a truck, springs of high rate are selected to support the vehicle load and such springs have limited ability to absorb bumps and vibrations. Improvements in truck wheel suspensions have been proposed to increase operator comfort. These constructions have been only moderately successful because the truck suspension must, first of all, support a very substantial vehicle load.

In view of the state of the art, it is a principal object of this disclosure to present a means for supporting a truck cab upon a chassis frame that will isolate from the cab vibrations associated with road irregularities.

BRIEF SUMMARY OF THE DISCLOSURE

The present disclosure relates to an improved means for supporting the cab of a truck on a truck chassis frame. For purposes of illustration it is disclosed in the environment of a truck having a tilt cab.

According to the disclosed embodiment of this invention, the cab suspension means includes a pair of forward suspension arms that have their ends pivotally connected to the cab and to the frame. An air spring and a hydraulic shock absorber is interposed between each of the forward suspension arms and the frame. A pair of rear suspension arms have their upper ends pivotally connected to the cab and their lower ends pivotally connected to latch mechanisms that are releaseably secured to the frame. An air spring and a hydraulic shock absorber is interposed between each of the latch mechanisms and the cab.

This suspension construction permits the cab to traverse a jounce and rebound path relative to the chassis frame and, thereby, isolate from the cab bumps and vibrations induced by the encounter of the vehicle wheels with road regularities.

A pneumatic pressure source is connected to each of the air springs. A leveling valve associated with each of the front springs regulates the air pressure in those springs and a single leveling valve regulates the pressure of the two rear springs. The air pressure in the front and rear springs is controlled in order to maintain the cab at a constant height above the frame.

A stabilizer bar extends transversely of the vehicle and interconnects the two front suspension arms near their pivotal connections with the cab. The stabilizer bar functions as an anti-roll device to prevent tilting of the cab about a longitudinal roll axis.

Left and right power cylinders arranged parallel to the front suspension arms interconnect the cab and the frame. A hydraulic pressure source and control system is connected to the latch mechanisms and to the power cylinders. When it is activated, the latches are disengaged and the power cylinders are pressurized. This produces a force which urges the cab upwardly and forwardly about a transverse tilt axis coinciding with the pivotal connection between the front suspension arms and the cab.

The present invention, rather than merely providing simple rubber mounts or similar devices between the cab and the frame, provides a full suspension system to assure driver comfort by isolating road vibrations and bumps from the cab.

BRIEF DESCRIPTION OF THE DRAWINGS

The many objects and advantages of a truck constructed in accordance with this invention will become apparent upon consideration of the following detailed discussion and the accompanying drawings, in which.

DETAIL DESCRIPTION OF THE PREFERRED EMBODIMENT

Figure 1:
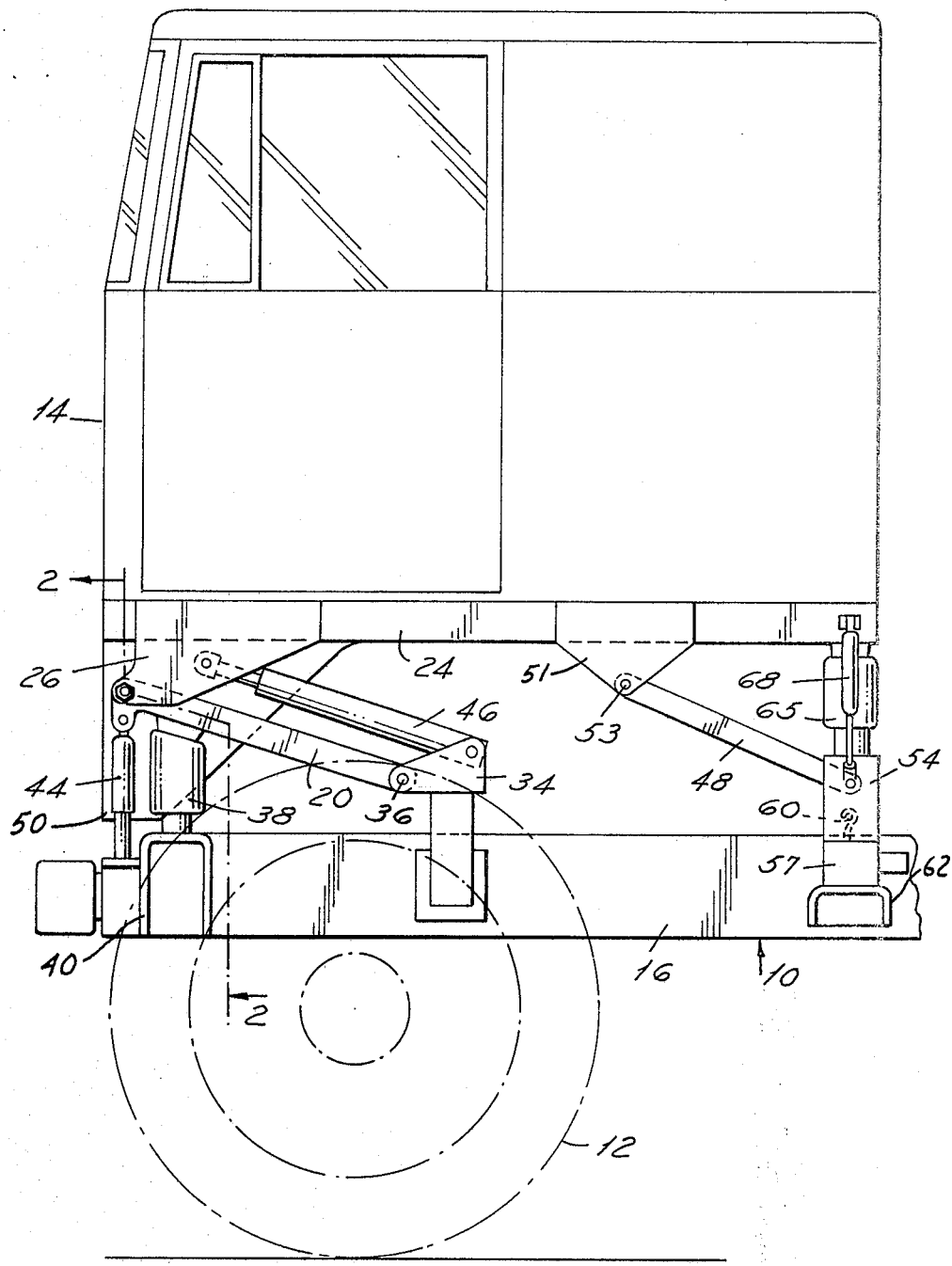
FIG. 1 is a side elevational view of a tilt cab truck embodying the present invention.

Referring now to the drawings, wherein the presently preferred embodiment of this invention is illustrated, FIG. 1 discloses a tilt cab truck having a unique suspension for supporting the cab upon the truck frame. The truck of FIG. 1 includes a frame assembly 10 that is supported by a wheel suspension on road wheels 12. A truck cab 14 accommodates a vehicle driver and is supported on the frame assembly 10 by a cab suspension which will be described. The truck of FIG. 1 is of the cab-over-engine type and means are provided to tilt the cab forwardly to expose the engine for servicing as will also be described.

The cab 14 is of generally box shape. It is connected to left and right frame side rails 16 and 18 by left and right front suspension arms 20 and 22. The cab 14 includes left and right structural members 24 and 25 which support left and right depending brackets 26 and 27. A tie rod 28 extends between the brackets 26 and 27. Left and right pivot bushings 30 and 31 are supported on the tie rod 28 adjacent the brackets 26 and 27. A stabilizer tube 32 encloses the tie rod 28 and has its ends pivotally supported by the left and right bushings 30 and 31. The forward ends of the left and right suspension arms 20 and 22 are secured to the outer ends of the stabilizer tube 32. With this structure, the bushings 30, 31 provide a pivotal connection between the suspension arms 20, 22 and the depending cab brackets 26, 27.

An upstanding bracket 34 is welded to the outside of the left longitudinal frame rail 16. The rearward end of the suspension arm 20 is pivotally connected to the bracket 34 by means of a resilient pivot bushing 36. In a similar manner, an upstanding bracket is welded to the right frame rail 18 and the right suspension arm 22 is pivotally connected to that bracket by a resilient pivot bushing.

Left and right air springs 38 and 39 are interposed between the left and right suspension arms 20 and 22 and the frame assembly 10. A bracket 40 is welded to the outside of the left frame rail 16 and the lower end of the air spring 38 is mounted on the bracket 40. The upper end of the spring 38 is connected to the suspension arm 20. In a similar fashion a bracket 42 is welded to the right frame rail 18 to provide a support for the lower end of the right front air spring 39. The upper end of air spring 39 is connected to the right front suspension arm 22.

Left and right front telescopic shock absorbers 44 and 45 have their lower ends connected to the left and right frame rails 16 and 18 and their upper ends pivotally connected to the suspension arms 20 and 22. The shock absorbers 44 and 45 are constructed similar to conventional hydraulic automotive shock absorbers to dampen jounce and rebound movement of the cab 14 relative to the frame 10. The shock absorbers 44 and 45 contain internal jounce and rebound bumpers which limit extreme vertical displacement of the cab 14.

Figure 5:
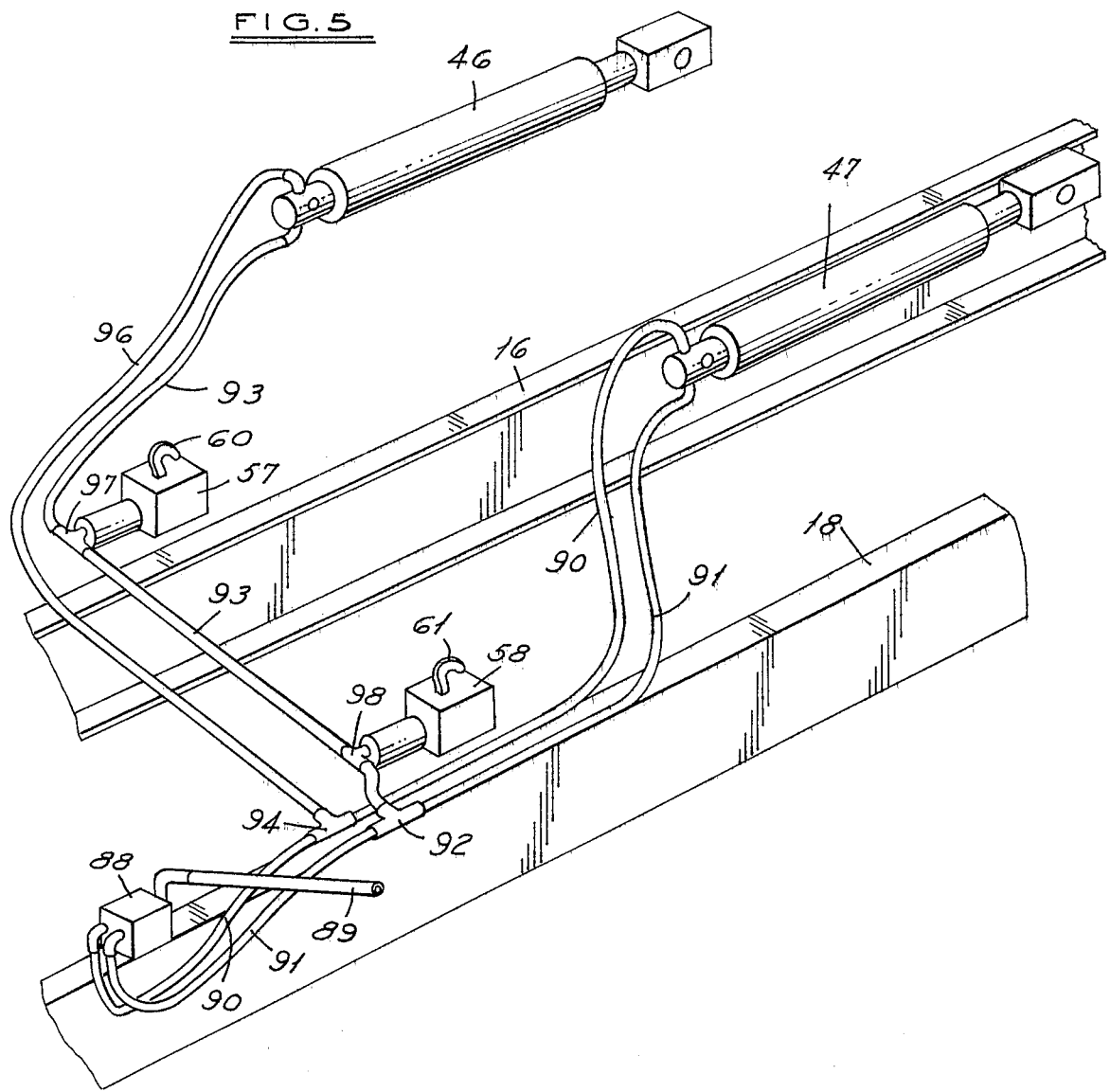
FIG. 5 is a perspective view in schematic form of the hydraulic mechanism for releasing the latch mechanisms and tilting the cab.

Left and right hydraulic power cylinders 46 and 47 have their forward ends pivotally connected to the cab brackets 26 and 27 and their rearward ends pivotally connected to the frame brackets 34. The power cylinders 46 and 47 are arranged parallel to the front suspension arms 20 and 22. The cylinders 46 and 47 are connected to the depending brackets 26 and 27 and the frame brackets 34 by pivot means having axes that are fixed with respect to the brackets. The power cylinders 46 and 47 are constructed to be pressurized and, thereby, exert forces upon the cab 14 which will tilt it forwardly about the axis of the bushings 30 and 31. The mechanism for controlling the power cylinders 46 and 47 is shown in FIG. 5 and will be described later.

Figure 4:
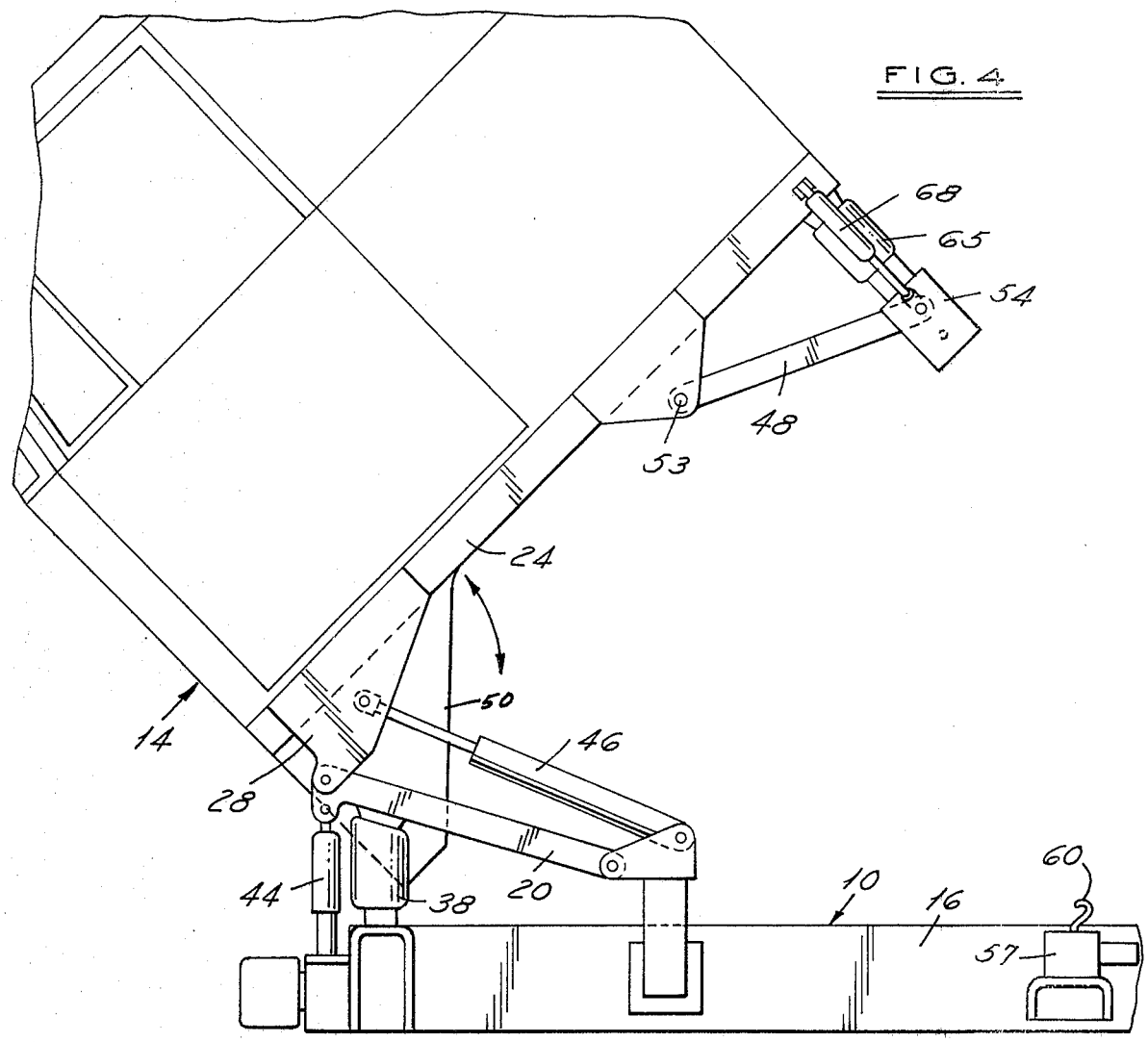
FIG. 4 is a side elevational view showing the cab in a partially tilted position.

Shrouds 50 depend from the left and right sides of the truck cab 14 to partially enclose the cab suspension structure. In FIGS. 1 and 4 the left shroud 50 is shown removed to expose this structure.

The suspension for the rear portion of the cab 14 includes left and right suspension arms 48 and 49. Left and right support brackets 51 and 52 are connected to the cab 14. The forward ends of the suspension arms 48, 49 are pivotally connected to the brackets 51, 52 by means of resilient pivot bushings such as bushing 53. The rearward ends of the left and right rear suspension arms 48 and 49 are pivotally connected to support members 54 and 55 which form part of the latch mechanisms. The support members 54 and 55 are secured to the left and right frame rails 16 and 18 by means of left and right hydraulic actuators 57 and 58 that control latch hooks 60 and 61 releaseably secured to the support members 54 and 55. The actuators 57 and 58 are mounted on brackets 62 and 63 secured to the side rails 16 and 18 and operate in a manner as will be described.

The suspension for the rear of the cab 14 includes left and right air springs 65 and 66. The left spring 65 has its lower end supported on the support member 54 and its upper end connected to portion 64 of the cab body structure. The air spring 66 is mounted on the right support member 55 and has its upper end engaging the cab portion 67.

The rear suspension for the cab 14 is completed by left and right telescopic shock absorbers 68 and 69. The shock absorbers 68 and 69 are generally of automotive suspension construction and have their upper ends pivotally connected to the cab body portions 64 and 67 and their lower ends connected to the support members 54 and 55. The shock absorbers 68 and 69 are designed to dampen jounce and rebound movement of the cab 14 with respect to the frame 10. They include internal jounce and rebound bumpers which function to limit the vertical movement of the cab 14 relative to the frame 10.

Figure 6:
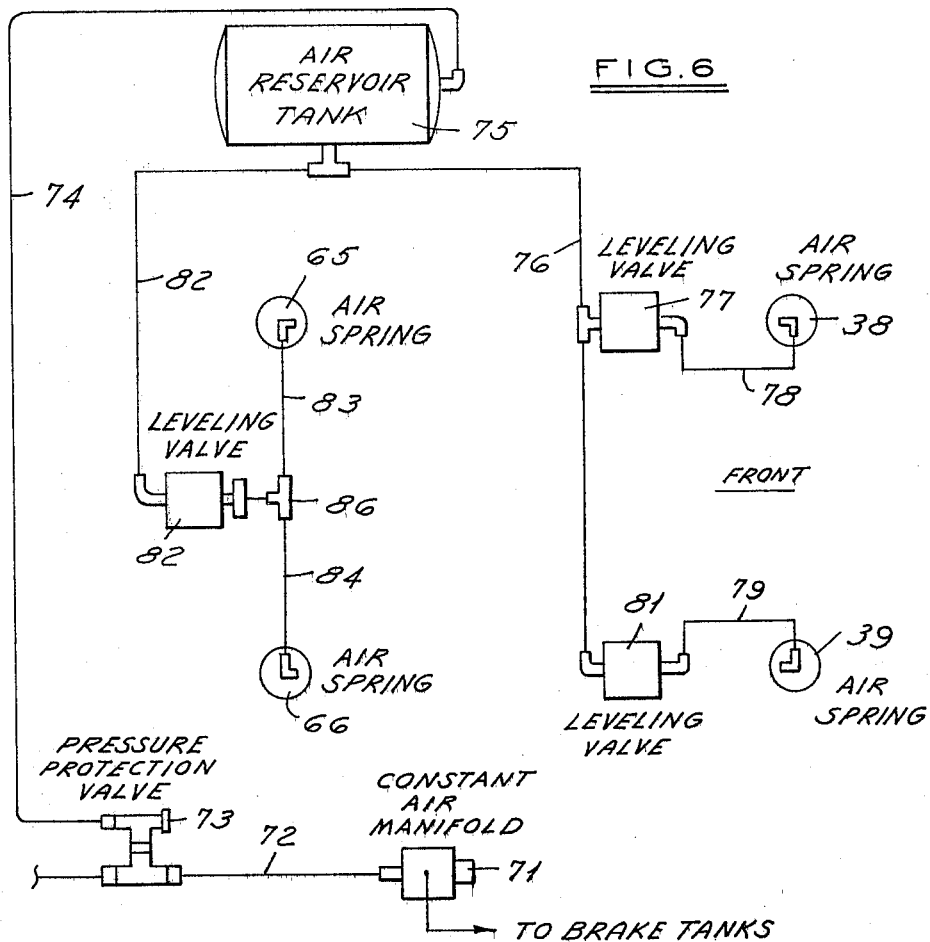
FIG. 6 is a diagrammatic view of the pneumatic system for regulating air pressure in the air springs.
Figure 2:
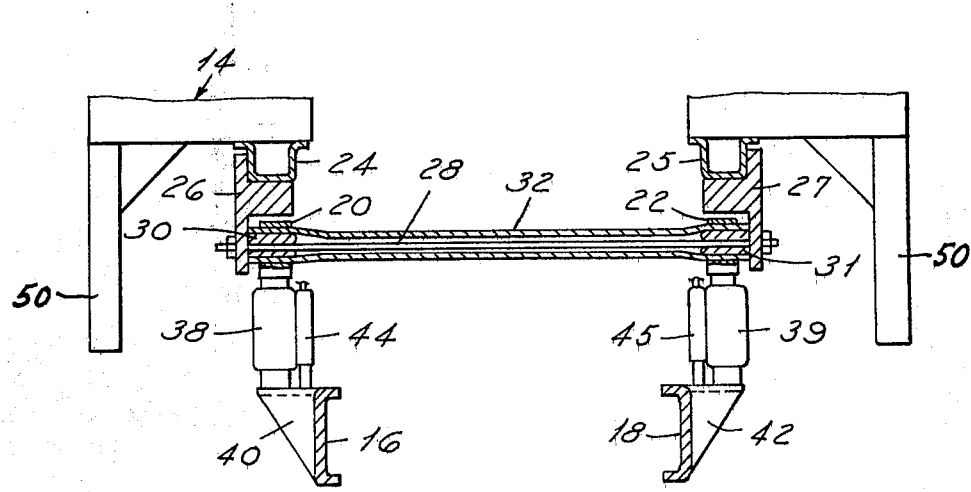
FIG. 2 is a sectional view taken along section line 2—2 of FIG. 1 of a portion of the front cab suspension.

An air pressure source and an air pressure regulating system for controlling the pressure in the front air springs 38, 39 and rear air springs 65, 66 is provided as shown in FIG. 6. An air manifold 71 is connected to a source of pressurized air such as the pressure tank of the truck's air brake system. An air line 72 is connected to the manifold 71 and to a pressure protection valve 73. Air line 74 extends between the valve 73 and an air reservoir tank 75. A front air suspension line 76 connects with a left front leveling valve 77 which is coupled to the left front air spring 38 by conduit 78. The right air spring 39 is joined through a conduit 79 to a leveling valve 81. The leveling valve 81 is in communication with the front air suspension line 76. A rear air suspension line 82 joins the reservoir tank 75 to a single rear leveling valve 83. Left and right air suspension lines 83 and 84 a T-fitting 86 join the rear air suspension springs 65 and 66 to the leveling valve 82. The operation of the air suspension system of FIG. 6 will be described below.

Figure 3:
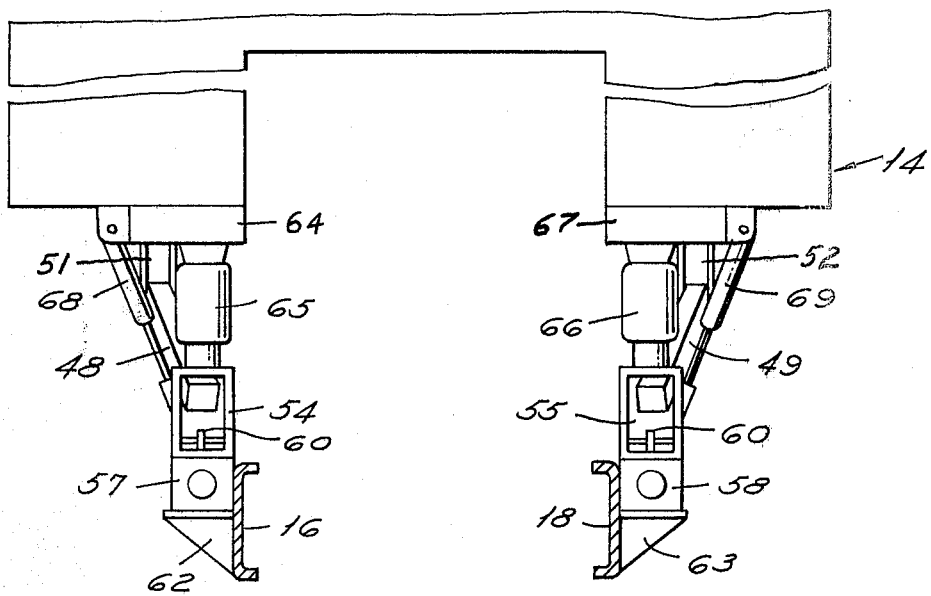
FIG. 3 is a rear elevational view of the rear cab suspension.

FIG. 5 illustrates the power system for tilting the cab forwardly in order to permit servicing of the engine. The principal components of the mechanism are shown in their appropriate relative position. The frame side rails 16 and 18 are included in the figure for reference purposes. The hydraulic actuators 57 and 58 for the latch hooks 60 and 61 are mounted on brackets 62 and 63 on the outboard sides of the rails 16 and 18 as shown in FIGS. 1 and 3.

A manual pump 88 having a control handle 89 is supported on the right side rail 18. A return line 90 and a pressure line 91 are coupled to input and output ports, respectively, of the pump 88. Pressure line 91 is connected to a pressure chamber situated on one side of the piston within the extendable power cylinder 47. The return line 90 is connected to the chamber on the other side of that piston.

A T-fitting 92 provides a connection for pressure line 93 which extends to the power cylinder 46. Line 93 is coupled to the pressure chamber on one side of the piston within the cylinder 46. A T-fitting 94 connects return line 96 with return line 90 and the pump 88. Return line 96 is connected to the chamber on the other side of the piston within the power cylinder 46.

The actuators 57 and 58 are coupled to the pressure line 93 by means of T-fitting 97 and 98.

OPERATION

During normal operation of the truck of FIG. 1, the cab 14 is maintained at a constant height above the frame assembly 10 by inflating the forward air springs 38, 39 and the rear air springs 65, 66 to an appropriate pressure. Referring to FIG. 6, the air reservoir tank 75 receives air pressure from a pressure source such as the vehicle's air brake system. The protection valve 73 is provided to protect the integrity of the air brake system in the unlikely event there is a leak in the air suspension system. The front leveling valves 77 and 81 are coupled to the reservoir tank 75. These valves sense the spacing between the front of the cab 14 and the frame assembly 10. They admit or exhaust air pressure from the front air springs 38 and 39 in an appropriate amount to maintain the cab 14 at a constant height above the frame 14 when the load in the cab 14 changes. The air springs 38 and 39 have a rubber sleeve or boot which defines an air chamber. The air springs 38, 39 are expanded and contracted in accordance with changes in their internal air pressure. The leveling valves 77 and 81 may be located within the air springs 38 and 39 or separately therefrom.

The rear air springs 65 and 66 are exapndable and contractable in their height in response to changes in their air pressure. The rear leveling valve 82 is connected to the air pressure reservoir tank 75 and feeds air to, or bleeds air from, the springs 65 and 66 in accordance with the spacing which the valve senses between the cab 14 and the frame assembly 10. The leveling valve 82 contains valve means which prevent the air springs from being deflated below a certain desired miminum air pressure.

When the vehicle of FIG. 1 is being driven over an irregular road the cargo of the vehicle is supported on the frame 10 which, in turn, is resiliently supported on the wheels 12 by high rate stiff suspension springs. In order to provide the vehicle operator in the cab 14 with maximum comfort the present cab suspension system is provided. The cab 14 will move up and down relative to the frame 10 as permitted by the articulation of the front suspension arms 20, 22 and the rear suspension arms 48, 49. The front air springs 38, 39 and the rear air springs 65, 66 have a relatively low spring rate whereby the jounce and vibration of the frame assembly 10 is effectively isolated from the cab 14. The air springs 38, 39, 65 and 66 resiliently support the cab 14 and the front shock absorbers 44, 45 and the rear shock absorbers 68, 69 dampen the movement of the cab 14. These shock absorbers contain internal jounce and rebound bumpers which limit the extent of up and down movement of the cab 14.

The disclosed arrangement of air springs and suspension arms permits greater jounce and rebound movement of the cab 14 relative to the frame 10 at a substantially lower spring rate than previously known methods for mounting a cab body on a vehicle frame. Another distinctive feature of the cab suspension is the anti-roll stabilizer tube 32 which prevents excessive roll of the cab 14 about a longitudinal roll axis when the vehicle is maneuvering around a corner.

It will be noted in the side elevational view (FIG. 1) that the front suspension arms 20, 22 are arranged at an angle to the horizontal that is less than the angle between the rear arms 48, 49 and a horizontal plane. This difference in slope of the front and rear arms provides anti-squat and anti-lift forces during acceleration and braking of the vehicle of FIG. 1.

The engine for the vehicle of FIG. 1 is supported on the frame 10 beneath the cab 14. When it is necessary to service the engine the hydraulic system of FIG. 5 is activated. The handle 89 for the pump 88 is reciprocated to develop hydraulic pressure in the hydraulic pressure lines 91 and 93. As the hydraulic pressure develops, the latch actuators 57 and 58 will be energized causing the latch hooks 60 and 61 to move to a disengaged position with respect to the support members 54 and 55. As the pressure continues to build up in the pressure lines 91 and 93, the cylinders 46 and 47 will be extended whereby the cab 14 will be tilted from its normal riding position of FIG. 1 to the engine exposing position of FIG. 4.

The tilting of the cab 14 will occur about the axis of the pivot bushings 30 and 31. The transverse stabilizer tube 32 will maintain the forward suspension arms 20 and 22 in fixed positions relative to each other so that the pivot axis for the tilting of the cab 14 will be maintained horizontal. It will be noted from FIG. 4 that the rear suspension for the cab 14 is connected to the support members 54 and 55 rather than directly to the frame 10 whereby release of the support members by the latches 60 and 61 will permit the cab 14 to tilt forwardly without requiring the disconnecting of individual suspension components.

The power cylinders 46 and 47 are arranged parallel to the front suspension arms 20 and 22 to form a parallelogram linkage system when the cab 14 is in its normal positions of FIG. 1. The cab 14, therefore, is free to move in jounce and rebound without interferring with the articulation of the arms 20 and 22. With this arrangement it is not necessary to provide conventional lost motion connections at one of the ends of the power cylinders 46 and 47.

In summary, the preferred embodiment of the present invention is characterized by a cab suspension which provides superior driver comfort and a cab tilting mechamism which is of simplified construction.

The foregoing description presents the presently preferred embodiment of this invention. Details of construction have been presented for purposes of illustration rather than limitation. Modifications and alterations will occur to those skilled in the art that will come within the scope and spirit of the following claims.

I claim:
1. A motor vehicle having a chassis frame, a vehicle body constructed to accommodate a vehicle operator and suspension means operatively interposed between said chassis frame and said body;
  said suspension means being constructed to accommodate jounce and rebound of said body relative to said chassis frame;
  said suspension means including a pair of front non-extensible suspension arms and a pair of rear non-extensible suspension arms;
  first pivot means pivotally connecting said front suspension arms to said body and said chasssis frame;
  second pivot means pivotally connecting said rear suspension arms to said body and said chassis frame;
  said front suspension arms and said rear suspension arms each being arranged at an acute angle to a horizontal plane;
  said front suspension arms and said rear suspension arms each extending forwardly and upwardly;
  said front suspension arms being arranged at a different acute angle to said horizontal plane than said rear suspension arms to thereby provide anti-squat and anti-lift forces during acceleration and braking;
  the forward ends of said front suspension arms being disposed adjacent the forward end of said body;
  the rearward ends of said rear suspension arms being disposed adjacent the rearward end of said body;
  a front suspension spring and a front telescopic hydraulic shock absorber interposed between each of said front suspension arms and said chassis frame;
  a rear suspension spring and a rear telescopic hydraulic shock absorber disposed adjacent each of said rear suspension arms and interposed between said body and said chassis frame;
  said front shock absorbers and said rear shock absorbers including resilient limit means constructed to resiliently limit the extent of jounce and rebound movement of said body with respect to said chassis frame;
  an anti-roll stabilizer bar operatively interconnecting said pair of front suspension arms.

\* \* \* \* \*